United States Patent
Knop et al.

(10) Patent No.: US 12,242,733 B1
(45) Date of Patent: Mar. 4, 2025

(54) DETERMINING A MEMORY CONTENTION STATE OF A NODE

(71) Applicant: International Business Machines Corporation, Armonk, NY (US)

(72) Inventors: Felipe Knop, Poughkeepsie, NY (US); John Lewars, New Paltz, NY (US); Olaf Weiser, Boeblingen (DE); Lyle Gayne, Saugerties, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 24 days.

(21) Appl. No.: 18/382,971

(22) Filed: Oct. 23, 2023

(51) Int. Cl.
G06F 3/06 (2006.01)

(52) U.S. Cl.
CPC .......... G06F 3/0617 (2013.01); G06F 3/0631 (2013.01); G06F 3/0634 (2013.01); G06F 3/067 (2013.01)

(58) Field of Classification Search
CPC .... G06F 3/0617; G06F 3/0631; G06F 3/0634; G06F 3/067
See application file for complete search history.

(56) References Cited

U.S. PATENT DOCUMENTS

| | | |
|---|---|---|
| 6,353,898 B1 | 3/2002 | Wipfel et al. |
| 6,442,713 B1 | 8/2002 | Block et al. |
| 7,747,756 B2 | 6/2010 | Chang et al. |
| 10,785,350 B2 | 9/2020 | Barszczak et al. |
| 10,938,701 B2 | 3/2021 | Kumar et al. |
| 2008/0288645 A1 | 11/2008 | Chang et al. |
| 2020/0028769 A1 | 1/2020 | Kumar et al. |

(Continued)

FOREIGN PATENT DOCUMENTS

| | | |
|---|---|---|
| CN | 103533058 B | 2/2017 |
| CN | 113595836 A | 11/2021 |
| EP | 1134658 A2 | 9/2001 |

OTHER PUBLICATIONS

Stackpath, "What is a Distributed System?" StackPath, 2023, 6 pages, retrieved from https://www.stackpath.com/edge-academy/what-is-a-distributed-system/#:~:text=A%20distributed%20system%2C%20also%20known,system%20to%20the%20end%2Duser.

(Continued)

*Primary Examiner* — Nanci N Wong
(74) *Attorney, Agent, or Firm* — Zilka Kotab, P.C.

(57) ABSTRACT

A computer-implemented method, according to one embodiment, includes causing a memory assessment thread to perform a first predetermined node memory contention state determination sequence for a predetermined first node. The first predetermined node memory contention state determination sequence includes recording a first timestamp, and allocating dedicated memory of the predetermined first node. The first predetermined node memory contention state determination sequence furthermore includes attempting to fill the allocated memory with content subsequent to recording the first timestamp, and recording a second timestamp after attempting to fill the allocated memory. The method further includes determining a first memory contention state of the predetermined first node based on results of performing the first predetermined node memory contention state determination sequence. The determined first memory contention state is caused to be included in a first type of message sent to a second node.

20 Claims, 8 Drawing Sheets

(56) References Cited

U.S. PATENT DOCUMENTS

2020/0112628 A1  4/2020  Barszczak et al.

OTHER PUBLICATIONS

Wikipedia, "Distributed computing," Wikipedia, 2023, 15 pages, retrieved from https://en.wikipedia.org/wiki/Distributed_computing.
Wikipedia, "Clustered file system," Wikipedia, 2023, 6 pages, retrieved from https://en.wikipedia.org/wiki/Clustered_file_system.
IBM, "Clusters and nodes," IBM Storage Insights, 2023, 2 pages, retrieved from https://www.ibm.com/docs/en/storage-insights?topic=resources-clusters-nodes.

400

402 ▶ if (T1 < T2) and ((T2 - T1) >= Threshold)  or

404 ▶ (T1 > T2) and ((Tc - T1) >= Threshold)

406 ▶ memoryStarvation = true

408 ▶ else

410 ▶ memoryStarvation = false

FIG. 4

DETERMINING A MEMORY CONTENTION STATE OF A NODE

BACKGROUND

The present invention relates to distributed systems, and more specifically, this invention relates to determining a memory contention state of a node.

A distributed system is a system having multiple components that are located on different network machines, e.g., network computers, where the components communicate and coordinate their actions by passing messages to one another in order to achieve a common goal.

One type of distributed system is a clustered file system. A clustered file system (CFS) is a file system which is shared by being simultaneously mounted on multiple servers. In some deployments, a "cluster" of the clustered file system is a group of redundant servers that provide uninterrupted service with component failures within the cluster. Therein, a node is an individual server that is configured within the cluster.

Distributed systems, and in particular clustered file systems, are designed to continue operating even when individual nodes of the clustered file systems fail. Upon detection of a node failure within a clustered file system, the remaining healthy nodes in the cluster typically can perform recovery, by forcing the failed node to relinquish its resources, and also by executing log recovery and/or replay for activities which were under way by the node around the time it failed.

SUMMARY

A computer-implemented method, according to one embodiment, includes causing a memory assessment thread to perform a first predetermined node memory contention state determination sequence for a predetermined first node. The first predetermined node memory contention state determination sequence includes recording a first timestamp, and allocating dedicated memory of the predetermined first node, where at least a majority portion of the dedicated memory is allocated. The first predetermined node memory contention state determination sequence furthermore includes attempting to fill the allocated memory with content subsequent to recording the first timestamp, and recording a second timestamp after attempting to fill the allocated memory. The method further includes determining a first memory contention state of the predetermined first node based on results of performing the first predetermined node memory contention state determination sequence. The determined first memory contention state is caused to be included in a first type of message sent to a second node.

A computer program product, according to another embodiment, includes a computer readable storage medium having program instructions embodied therewith. The program instructions are readable and/or executable by a computer to cause the computer to perform any combination of features of the foregoing methodology.

A system, according to another embodiment, includes a processor, and logic integrated with the processor, executable by the processor, or integrated with and executable by the processor. The logic is configured to perform any combination of features of the foregoing methodology.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4 is a sample of logical code, in accordance with one embodiment of the present invention.

DETAILED DESCRIPTION

Figure 1:
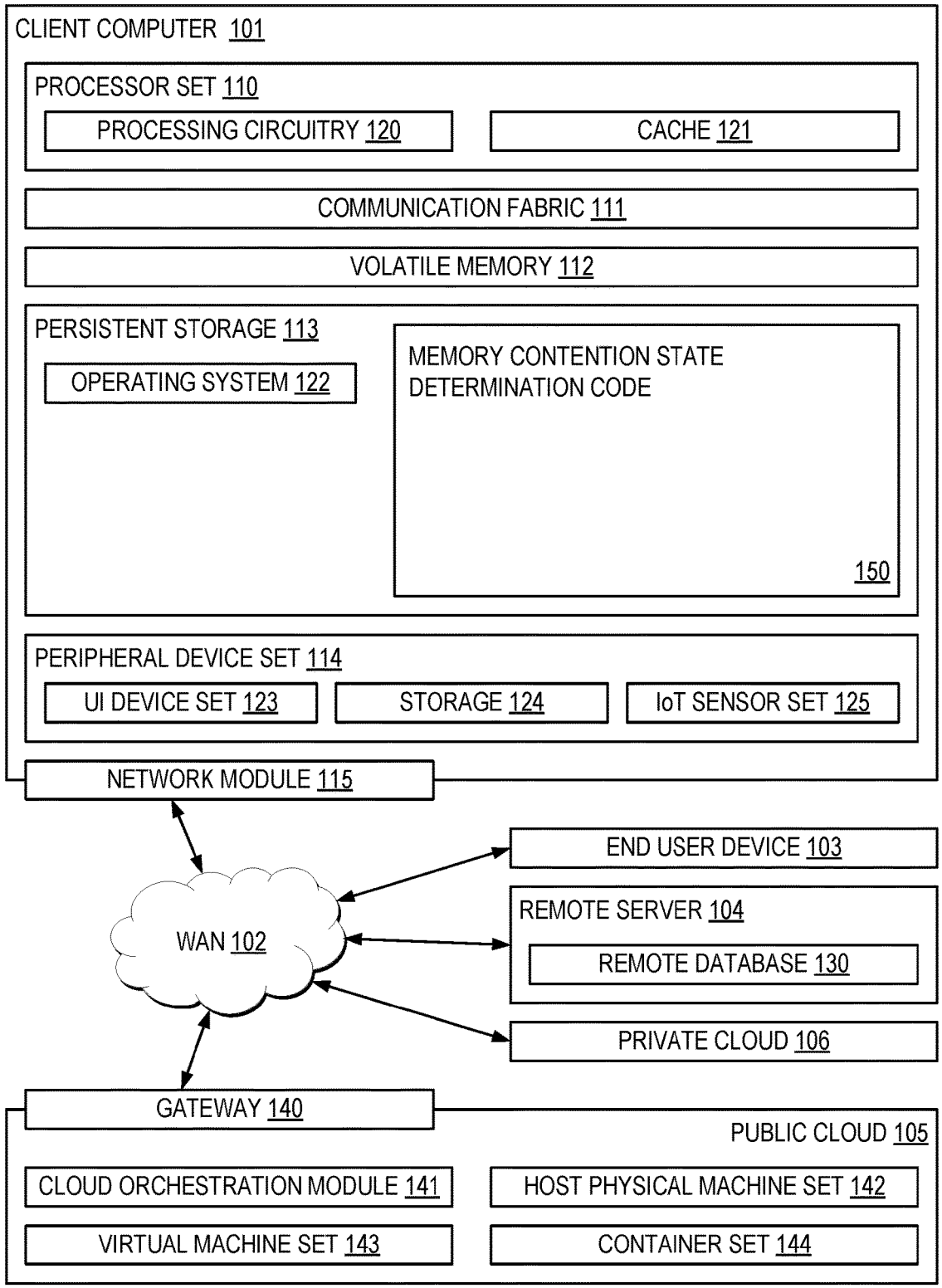
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for determining a memory contention state of a node.

In one general embodiment, a computer-implemented method includes causing a memory assessment thread to perform a first predetermined node memory contention state determination sequence for a predetermined first node. The first predetermined node memory contention state determination sequence includes recording a first timestamp, and allocating dedicated memory of the predetermined first node, where at least a majority portion of the dedicated memory is allocated. The first predetermined node memory contention state determination sequence furthermore includes attempting to fill the allocated memory with content subsequent to recording the first timestamp, and recording a second timestamp after attempting to fill the allocated memory. The method further includes determining a first memory contention state of the predetermined first node based on results of performing the first predetermined node memory contention state determination sequence. The determined first memory contention state is caused to be included in a first type of message sent to a second node.

In another general embodiment, a computer program product includes a computer readable storage medium having program instructions embodied therewith. The program instructions are readable and/or executable by a computer to cause the computer to perform any combination of features of the foregoing methodology.

In another general embodiment, a system includes a processor, and logic integrated with the processor, executable by the processor, or integrated with and executable by the processor. The logic is configured to perform any combination of features of the foregoing methodology.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as memory contention state determination code of block 150 for determining a memory contention state of a node. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

Figure 2:
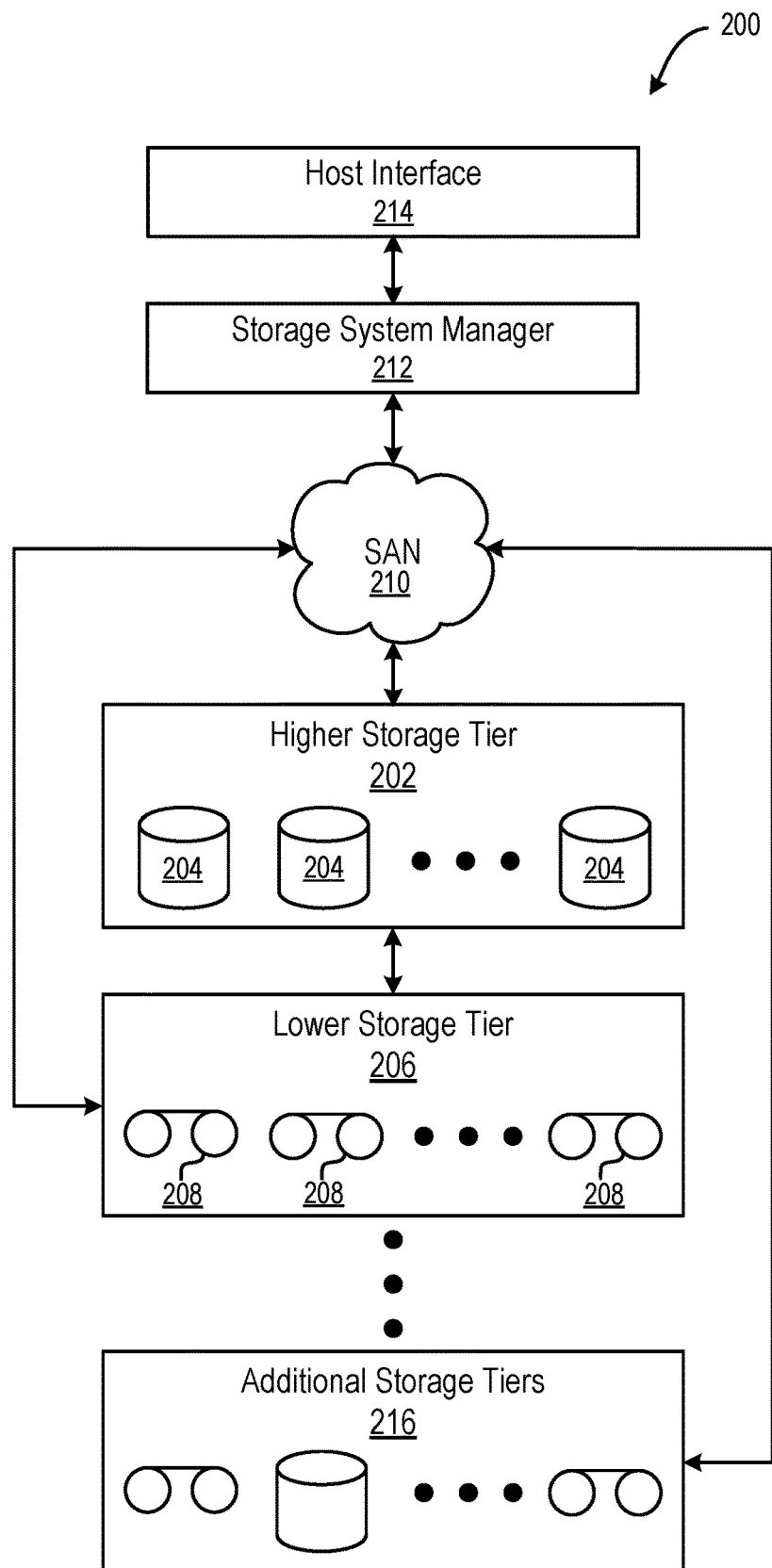
FIG. 2 is a diagram of a tiered data storage system, in accordance with one embodiment of the present invention.

Now referring to FIG. 2, a storage system 200 is shown according to one embodiment. Note that some of the elements shown in FIG. 2 may be implemented as hardware and/or software, according to various embodiments. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a SAN, as shown in FIG. 2, Internet Protocol (IP) network, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

As mentioned elsewhere above, a distributed system is a system having multiple components that are located on different network machines, e.g., network computers, where the components communicate and coordinate their actions by passing messages to one another in order to achieve a common goal.

One type of distributed system is a clustered file system. A clustered file system (CFS) is a file system which is shared by being simultaneously mounted on multiple servers. In some deployments, a "cluster" of the clustered file system is a group of redundant servers that provide uninterrupted service with component failures within the cluster. Therein, a node is an individual server that is configured within the cluster.

Distributed systems, and in particular clustered file systems, are designed to continue operating even when individual nodes of the clustered file systems fail. Upon detection of a node failure within a clustered file system, the remaining healthy nodes in the cluster typically can perform recovery, by forcing the failed node to relinquish its resources, and also by executing log recovery and/or replay for activities which were under way by the node around the time it failed.

Node failures are sometimes detected by a liveness detection mechanism, e.g., heartbeats, where nodes communicate with other nodes in a periodic fashion. When such communication ceases for a given node, other nodes in the cluster may be caused to interpret the unresponsive node (which is expected to initiate or respond to a message of the detection mechanism to indicate responsiveness) as having failed. In typical cases, these node failures may occur as a result of, e.g., the node experiencing a power failure event, functionality of the node being compromised as a result of a crash event in a software stack that the node depends on, a kernel or user space that is used to implement a function of a filesystem on the node failing, etc. In some other cases, this determination that the node is unresponsive may be made, even though it is possible that the failure was not within the node itself, but instead was within an underlying communication network that connects the nodes. In other words, although the node remains functionally "healthy" from a performance perspective, the node may be unresponsive based on, e.g., a network that links the node to other nodes in the cluster failing. One example of such a network failure that may result in an otherwise functional node being prevented from responding to and/or sending liveness detection messages may occur in a cluster in which a node has a communications adapter that has a cable that routes though a switch of the cluster. In response to this switch losing power, even though the node itself may be functioning normally, the node may be considered unresponsive based on node liveness communications being unable to pass through the switch in the cluster.

As long as a determination is made from the liveness mechanism that a given node remains alive, e.g., the node is deemed responsive based on a determination that the node is sending and/or responding to liveness messages, other nodes in the cluster may allow tasks assigned to the given node to take as long as they need to, under the assumption that the node is still making progress on them. However, in situations in which an unbounded delay occurs at the node, a task within the cluster that includes the unresponsive node may not be completed. For context, an "unbounded delay" may, in some use cases, be defined as more than a predetermined amount of time passing, e.g., ten seconds, thirty-five seconds, one minute, etc., during which a response and/or message is not detected from the node. Based on this unbounded delay and the task not being completed, in distributed systems, the delay may affect the operation or efficiency of the entire cluster, especially in deployments in which a distributed lock system is present in the clustered file system.

Each node of a cluster typically has dedicated memory which may be local physical memory and/or virtual memory. The occurrence of "memory contention" on a given node may refer to an instance in which a majority, or all, of the dedicated memory of the given node not being available for an operation. In one illustrative example, memory contention on a given node may occur where the given node has a relatively high intensity workload being performed, e.g., a relatively large read and/or write operation, an application of the node using a relatively large portion of memory to perform computations on a relatively large amount of data, etc., and the memory subsystem acts as a bottleneck, e.g., a relatively small amount or no amount of the given node's memory is unoccupied and otherwise available for being used for the workload. For context, this workload may include any combination of, e.g., using memory bandwidth to transfer data over a network, using memory bandwidth to access disk devices, computing a checksum while reading data from a disk, "trashing" of pages of storage in which pages are paged out to secondary storage but then needed (and thereby recalled) less than a second later, etc.

Node delays also occur in situations in which there is relatively high memory contention at a given node. When such memory contention causes memory to be paged out, e.g., swapping, execution tends to be delayed by a relatively large factor, to the point where the node may appear to be stuck or frozen. For example, this relatively large factor may slow the throughput of a node by a factor of one thousand or more. As a result, this delay may cause a node task that would otherwise take a second to take a number of hours. Memory contention tends to cause unpredictable delays across a node or even within a single execution process, such that threads within that process may experience different, unpredictable, delays. While some threads may proceed with minimal impact, others may be delayed or blocked for long periods, e.g., if paging or memory allocation are required. It is common for threads that are executed relatively often and perform repeated flows to be able to execute with relatively little delay, especially because, when making choices about which pages to swap out, an operating system typically selects pages determined to be relatively less frequently accessed. On the other hand, an infrequently traversed path will either not have its pages loaded in memory or be the first to be paged out, and exercising these paths is likely to result in relatively long delays.

Conventional liveness checks, such as those described above, cannot be used to determine whether a node that is responsive to messages otherwise is experiencing "memory starvation" issues, e.g., a majority or all of the dedicated memory of the node is used and thereby unavailable. This is because a node that is currently experiencing a memory starvation issue may be able to respond to a liveness message, despite a workload of the node being indefinitely delayed based on the node having no available memory. Because liveness checks may be sent periodically and relatively frequently, the memory areas (for instructions and data) traversed are more likely to remain in memory (and not be paged out), and as a result the memory-starved nodes are still considered alive. Meanwhile, other less traversed code paths are more likely to be blocked if the node is low on memory.

In sharp contrast to the deficiencies described above, the techniques of embodiments and approaches described herein include techniques for determining whether an unresponsive node of a node of a clustered file system is relatively low on memory. This determination may be made by causing a memory assessment thread to perform one or more predetermined memory contention state determination sequence(s) for at least one node of a cluster. During a memory contention state determination sequence, timestamps are recorded with respect to relatively memory intensive operations that are performed, and the timestamps are used to determine whether the node is experiencing memory starvation, e.g., has less than a predetermined amount of dedicated memory of the node left available. This determination is then caused to be relayed to another node of the clustered file system to prevent the memory starvation from delaying processing on nodes within the cluster of the clustered file system.

Figure 3A:
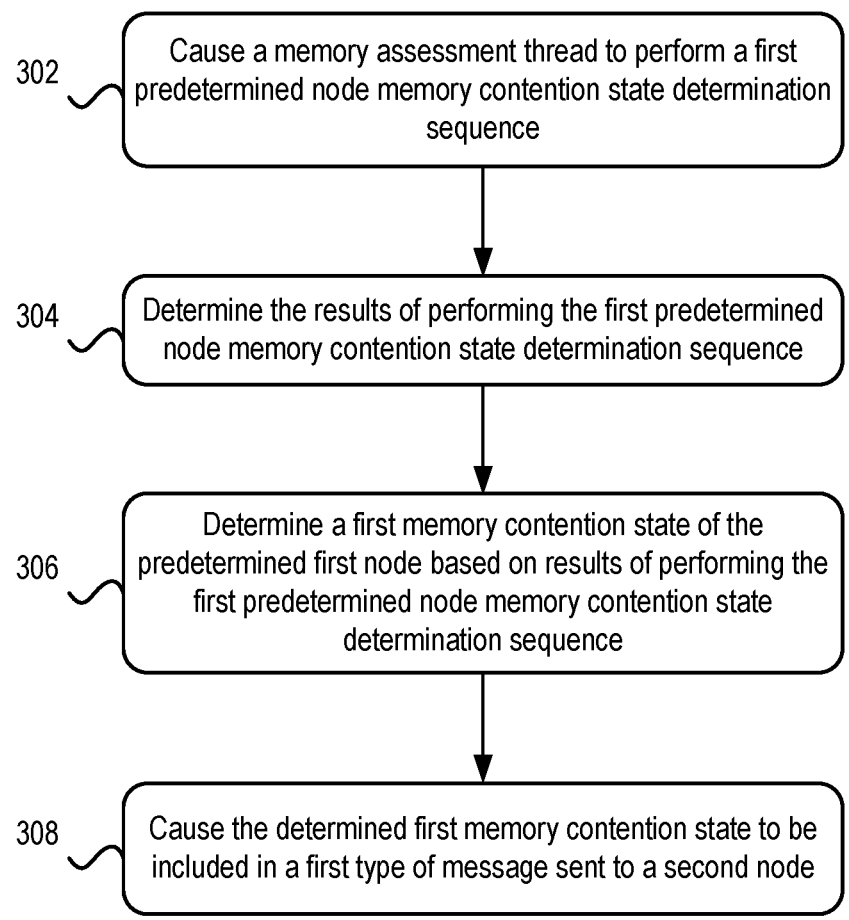
FIG. 3A is a flowchart of a method, in accordance with one embodiment of the present invention.

Now referring to FIG. 3A, a flowchart of a method 300 is shown according to one embodiment. The method 300 may be performed in accordance with the present invention in any of the environments depicted in FIGS. 1-5, among others, in various embodiments. Of course, more or fewer operations than those specifically described in FIG. 3A may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method X00. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 300 may be performed in clustered file system environment. More specifically, in some preferred approaches, the clustered file system environment includes at least one cluster of nodes, and the cluster of nodes includes a plurality of nodes that are configured to communicate with nodes of the cluster of nodes. For example, in one or more of such approaches, these nodes being configured to communicate with one another may include, e.g., at least some of the nodes being configured to initiate a message of a detection mechanism to determine responsiveness of another node, at least some of the nodes being configured to respond to a message of the detection mechanism to indicate responsiveness of the node, at least some of the nodes being configured to interact with another node of the cluster to collaboratively perform a predetermined task, etc. Furthermore, at least one of the nodes of the cluster of nodes is, in some preferred approaches, a cluster manager node. Nodes of the cluster that are not the cluster manager node may, in some of such approaches, be configured to send expel requests to the cluster manager node. For context, an "expel request" is preferably a message that requests that a node indicated in the message be at least temporarily functionally excluded from the cluster, e.g., masked. As will be described in greater detail in approaches herein, expel requests may be sent to the cluster manager node in response to a determination that a node (that is ultimately indicated in the expel request) is experiencing a condition associated with delay, e.g., memory starvation, power loss, etc.

Operation 302 includes causing a memory assessment thread to perform a predetermined memory contention state determination sequence. It should be noted that a first predetermined memory contention state determination sequence (also referred to herein as the "first sequence") for a predetermined first node will be described first in various approaches below (see FIG. 3B), followed by descriptions of a second predetermined memory contention state determination sequence (also referred to herein as the "second sequence") for the predetermined first node (see FIG. 3C). Method 300 may include performing the first sequence and/or the second sequence, depending on the approach.

The memory assessment thread may, in some approaches, be a thread of a type that would become apparent to one of ordinary skill in the art after reading the descriptions herein. The thread may be initiated by and performed on a node that method 300 is being performed on, in some approaches. For context, the first predetermined memory contention state determination sequence may, in some preferred approaches, be predetermined operation(s) that are performed in order to determine the memory contention state of the first predetermined node, e.g., a state that indicates whether the predetermined first node is experiencing memory starvation. As indicated elsewhere herein, in some approaches, memory starvation of a node exists when less than a predetermined amount of dedicated memory associated with the node is currently available on the node.

It should be noted that although various approaches are described herein with respect to the predetermined node memory contention state determination sequences being performed with respect to a first node, in some other approaches, method 300 may additionally and/or alternatively be performed with respect to any number of nodes, e.g., a second node of the cluster, a third node of the cluster, a fourth node of the cluster, etc. Predetermined node memory contention state determination sequences may, in some approaches, be performed for a given node for one or more predetermined reasons. For example, in some approaches, the first predetermined node memory contention state determination sequence may, in some approaches, be performed for a first node in response to a determination that the first node is unresponsive, e.g., the first node has not responded to an inquiry sent from a second node to the first node within at least a predetermined amount of time. In some other approaches, the first predetermined node memory contention state determination sequence may, in some approaches, additionally and/or alternatively be performed for a first node periodically. In some other approaches the first predetermined node memory contention state determination sequence may additionally and/or alternatively be performed for a first node in response to a determination that the first node and/or another node has joined the cluster. The first predetermined node memory contention state determination sequence may additionally and/or alternatively be performed for the first node in response to a determination that another node has at least temporarily left the cluster.

Figure 3B:
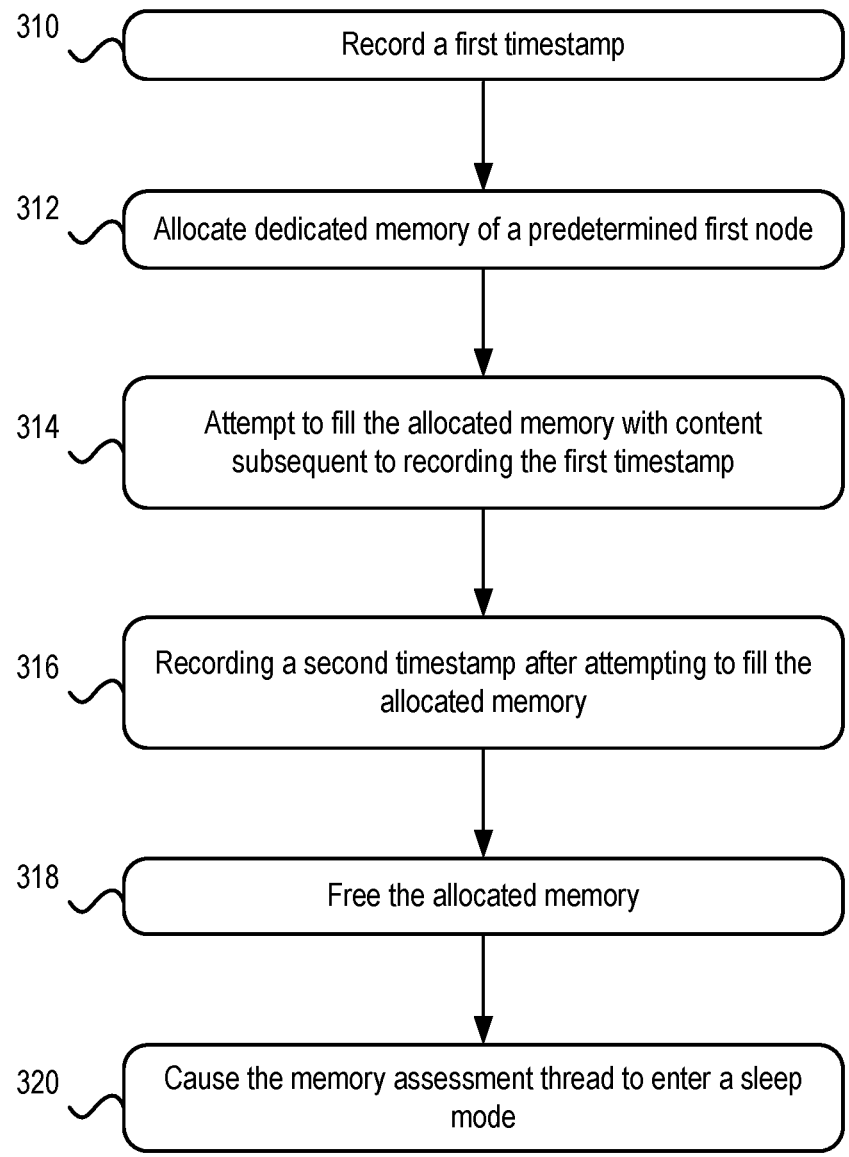
FIG. 3B is a flowchart of sub-operations of an operation of FIG. 3A, in accordance with one embodiment of the present invention.

Looking to FIG. 3B, exemplary sub-operations of performing the first predetermined memory contention state determination sequence are illustrated in accordance with one embodiment, one or more of which may be used to perform operation 302 of FIG. 3A. However, it should be noted that the sub-operations of FIG. 3B are illustrated in accordance with one embodiment which is in no way intended to limit the invention.

It may be prefaced that, in some approaches, the sub-operations of FIG. 3B may be performed in the order shown in FIG. 3B, although in some other approaches, one or more of the sub-operations may optionally not be performed and/or performed in any other order.

Sub-operation 310 includes recording a first timestamp. In some approaches, the first timestamp is recorded with a memory assessment thread of a type that would become apparent to one of ordinary skill in the art after reading the descriptions herein. The first timestamp may be stored in a predetermined shared memory device, e.g., a memory device that is accessible to nodes of the cluster that includes the first node. However, it should be noted that the storing of such a timestamp is, in some approaches, only an optional operation, and may be selectively performed depending on, e.g., received administrator preferences, an amount of available memory in the predetermined shared memory device, etc. For context, the first timestamp may record a starting time of the first predetermined memory contention state determination sequence.

In order to determine the node memory contention state of the first node, in some approaches, a predetermined type of operation associated with dedicated memory of the first node may be performed. For example, in some preferred approaches, dedicated memory of the first node is allocated, e.g., see sub-operation 312. This allocation is, in some approaches, performed using the memory assessment thread, and is performed immediately after recording the first timestamp (the first timestamp marks initiation of the allocation). For context, because memory starvation may be characterized by dedicated memory of the first node being unavailable, e.g., at least a predetermination of the dedicated memory being consumed, all of the dedicated memory being unavailable for performing a read and/or write operation, etc., in some preferred approaches, at least a majority portion of the dedicated memory is allocated in sub-operation 312. It may be noted that, in some approaches, the memory may eventually become available, e.g., the memory starvation may subside, however, this may take a relatively long period of time to occur based on the system being memory-starved. The dedicated memory may be allocated, e.g., at least temporarily reserved, using techniques that would become apparent to one of ordinary skill in the art after reading the descriptions herein.

Sub-operation 314 includes attempting to fill the allocated memory with content. Because in some approaches, the attempted fill of the allocated memory is performed after the memory has been allocated, the attempted fill of the allocated memory may also be performed subsequent to recording the first timestamp. In order to fill the allocated memory with content, in some approaches, a write operation is performed on the allocated memory. The data that is used during the write operation may, in some approaches, include, e.g., data that was scheduled to be written to dedicated memory of nodes of the clustered file system, a write sequence having a predetermined pattern ("010101 . . . ", "00110011 . . . ", etc.), a predetermined number of "zero" data values, a predetermined number of "one" data values.

A second timestamp is recorded with the memory assessment thread after attempting to fill the allocated memory, e.g., see sub-operation 316. For context, the second timestamp is different than the first timestamp where the recording of the second timestamp is attempted to be performed after the first timestamp is recorded and preferably after attempting to fill the allocated memory is complete. In some approaches, the allocated memory is successfully filled, and therefore, the second timestamp is preferably recorded in response to the allocated memory being filled. In these approaches, because the second timestamp is recorded after the first timestamp is recorded and once the allocated memory is successfully filled, the second timestamp can be expected to be greater than the first timestamp, e.g., a value of the first timestamp is less than a value of the second timestamp. However, in some other approaches, the first node may be unable to fill the allocated memory for some reason, and therefore the second timestamp may be recorded as a null value, e.g., where the method is configured to record a null value in response to a determination that the first node is unable to fill the allocated memory within a predetermined amount of time. For context, one reason the first node may be unable to fill the allocated memory may be that, by the time the timestamps are checked, the memory allocation and/or fill operation are not yet completed. In some approaches, this determination may be based on whether the node is unresponsive. In these approaches, because the second timestamp is recorded as a null value, the second timestamp can be characterized as having a relatively lesser value than a value of the first timestamp, e.g., the value of the second timestamp is less than the value of the first timestamp. One possible reason for the second timestamp having a relatively lesser value than the value of the first timestamp is that the second timestamp may not yet be updated upon being recorded, and therefore the value of the second timestamp may be a value from a prior performance of the node memory contention state determination sequence.

The first predetermined memory contention state determination sequence optionally includes resetting the memory assessment thread after attempting to fill the allocated memory. In other words, with the first timestamp and the second timestamp recorded, the memory assessment thread may be reset. In some approaches, in order to reset the memory assessment thread, the first sequence includes freeing, with the memory assessment thread, the allocated memory, e.g., see sub-operation 318. Freeing the allocated memory may include, e.g., overwriting the content of the allocated memory that was added as a result of the attempt to fill the allocated memory, setting the allocated memory as available memory for writing to, deleting the content of the allocated memory that was added as a result of the attempt to fill the allocated memory, setting the allocated memory as a location for performing garbage collection, etc.

Resetting the memory assessment thread after attempting to fill the allocated memory may additionally and/or alternatively include optionally causing the memory assessment thread to enter a sleep mode, e.g., see sub-operation 320. The memory assessment thread may, in some approaches, be caused to enter into the sleep mode at least until a next first iteration of the memory contention state determination sequence is performed for the first node.

Referring again to FIG. 3A, results of performing the first sequence are preferably determined, e.g., see operation 304. In some approaches, determining the results of performing the first sequence includes comparing the first timestamp to the second timestamp. For context, in some approaches, the first timestamp may be compared with the second timestamp in order to determine the amount of time that allocating the dedicated memory and attempting to fill the allocated dedicated memory took. This determined amount of time may be used to determine results of performing the first sequence which are ultimately used to determine the first memory contention state of the predetermined first node. Various techniques for performing such comparisons, determining the results of performing the first sequence and determining the first memory contention state of the predetermined first node are described below.

In some approaches, determining the results of performing the first sequence includes determining whether a predetermined condition is met. More specifically, in some of such approaches, the predetermined condition is based on the comparison of the first timestamp and the second timestamp. For example, in one preferred approach, the first predetermined condition includes the first timestamp being less than the second timestamp, e.g., a value of the first timestamp is less than a value of the second timestamp. For context, the first timestamp being less than the second timestamp may indicate that the allocated memory was successfully filled, e.g., the second timestamp is not a null value. The first predetermined condition preferably also includes a difference of the second timestamp and the first timestamp being greater than or equal to a predetermined threshold. For context, the predetermined threshold is preferably less than a predetermined unbounded delay, and may, in some approaches, be about an amount of time that the predetermined first node when not experiencing memory contention issues has previously been determined able to fill the allocated memory in. In some approaches, the predetermined amount of time is about thirty-five seconds, although the predetermined amount of time may be another predetermined amount of time in some other approaches, e.g., ten seconds, one minute, ten minutes, etc. In some approaches, the difference of the second timestamp and the first timestamp being greater than or equal to the predetermined threshold indicates that the predetermined first node is experiencing memory contention.

Operation 306 includes determining a first memory contention state of the predetermined first node based on results of performing the first sequence, e.g., based on the activities of the memory assessment thread. In continuance of the predetermined condition described above, in response to a determination that a first predetermined condition is met, e.g., the difference of the second timestamp and in response to a determination that the first timestamp is greater than or equal to the predetermined threshold, method 300 includes setting the first memory contention state of the predetermined first node to true.

Another predetermined condition, e.g., hereafter referred to as the second predetermined condition, which may be used to determine the first memory contention state of the predetermined first node may additionally and/or alternatively be based on a current timestamp, e.g., a timestamp recorded at a time that the second predetermined condition is evaluated. In some approaches, the current timestamp is recorded after the first timestamp is recorded and after the second timestamp is recorded. Accordingly, in some approaches, the first sequence includes obtaining a current timestamp. Determining the results may include comparing the first timestamp to the second timestamp and determining a difference of the current timestamp and the first timestamp. A second predetermined condition that is based on the comparison of the first timestamp to the second timestamp and determining a difference of the current timestamp and the first timestamp is preferably determined. The second predetermined condition may, in some approaches, include the first timestamp being greater than the second timestamp. In other words, in order for the second predetermined condition to be met, the second timestamp must be a null value based on, e.g., the attempt to fill the allocated memory being unsuccessful, the attempt to fill the allocated memory not yet being successfully completed by the time that the situation is assessed (the second timestamp is obtained), etc. This is because the first timestamp is preferably recorded before the memory allocation and the second timestamp is preferably recorded after the attempt is made to fill the allocated memory. The second predetermined condition, in some approaches, additionally includes the difference of the current timestamp and the first timestamp being greater than or equal to the predetermined threshold. For context, the difference of the current timestamp and the first timestamp being greater than or equal to the predetermined threshold may infer that the attempt to fill the allocated memory with content took longer than the amount of time that a node that is not experiencing memory contention would be expected to take to fill the allocated memory.

As mentioned elsewhere above, operation 306 includes determining the first memory contention state of the predetermined first node based on results of performing the first sequence. With respect to the second predetermined condition, method 300 preferably includes setting the first memory contention state of the predetermined first node to true in response to a determination that the second predetermined condition is met. The first memory contention state of the predetermined first node being set to true indicates that the predetermined first node is experiencing memory contention, e.g., does not have more than a predetermined amount of dedicated memory available.

In some approaches, the first memory contention state of the predetermined first node may be set to false in the "else" case of the predetermined conditions described above. For example, in response to a determination that the first predetermined condition is not met and a determination that the second predetermined condition is not met, determining the results of performing the first sequence may include setting the first memory contention state of the predetermined first node to false. For context, the first memory contention state of the predetermined first node being set to false indicates that the predetermined first node is not experiencing memory contention (has at least a predetermined amount of dedicated memory of the node available).

Operation 308 includes causing the determined first memory contention state to be included in a first type of message sent to a second node. Although in some approaches, the determined first memory contention state may be simply sent to one or more other nodes from the predetermined first node, in some preferred approaches, the determined first memory contention state is included in a periodic remote procedure to preserve processing resources of the predetermined first node and to limit communication traffic among the nodes within the cluster. For example, in some approaches, the first type of message is a message that is periodically sent to the second node by the predetermined first node. For example, in some approaches, the first type of message is a liveness detection message such as a disk lease remote procedure call. For context, the disk lease remote procedure call may be a remote procedure call that is configured to indicate that the predetermined first node is able to periodically respond to one or more other nodes, e.g., to indicate that the predetermined first node has not experienced a power loss event. Accordingly, in some approaches, method 300 optionally includes periodically sending the first type of message from the predetermined first node to the second node. The first memory contention state may be appended to and/or included in one of these period messages.

In some approaches, the first type of message requests the second node to respond to a message previously sent to the second node by the predetermined first node, e.g., which may also be a "check messages" remote procedure call. The check messages remote procedure call may be sent periodically between predetermined nodes. Inclusion of the first memory contention state in a reply to such a type of message mitigates delays on a node which is relatively low on memory. In yet some other approaches, the first type of message may be a reply to a second type of message received by the predetermined first node from the second node. For example, the second type of message may be a message that is periodically sent from the second node to the predetermined first node.

The second node may, in some approaches, be any other node of the cluster that the predetermined first node is included in. In some preferred approaches, the second node is a cluster manager node that manages the cluster that includes the predetermined first node. In order to manage the cluster, the cluster manager node may be configured to, at least temporarily, expel at least one node from the cluster in response to a determination that a determined memory contention state associated with the node is set to true. For example, in response to a determination that the determined first memory contention state is set to true, the cluster manager may expel the predetermined first node from the cluster.

In some approaches, the cluster manager node may be caused to receive liveness detection messages from a plurality of the other nodes of the cluster. At least some of these messages, and preferably all of these messages, include a memory contention state for an associated node. In some approaches, the cluster manager node expels a given node from the cluster in response to a determination that an expel request exists for the given node and in response to a determination that a relatively most recent message received from the given node has a memory contention state associated with the given node that is set to true.

Figure 3C:
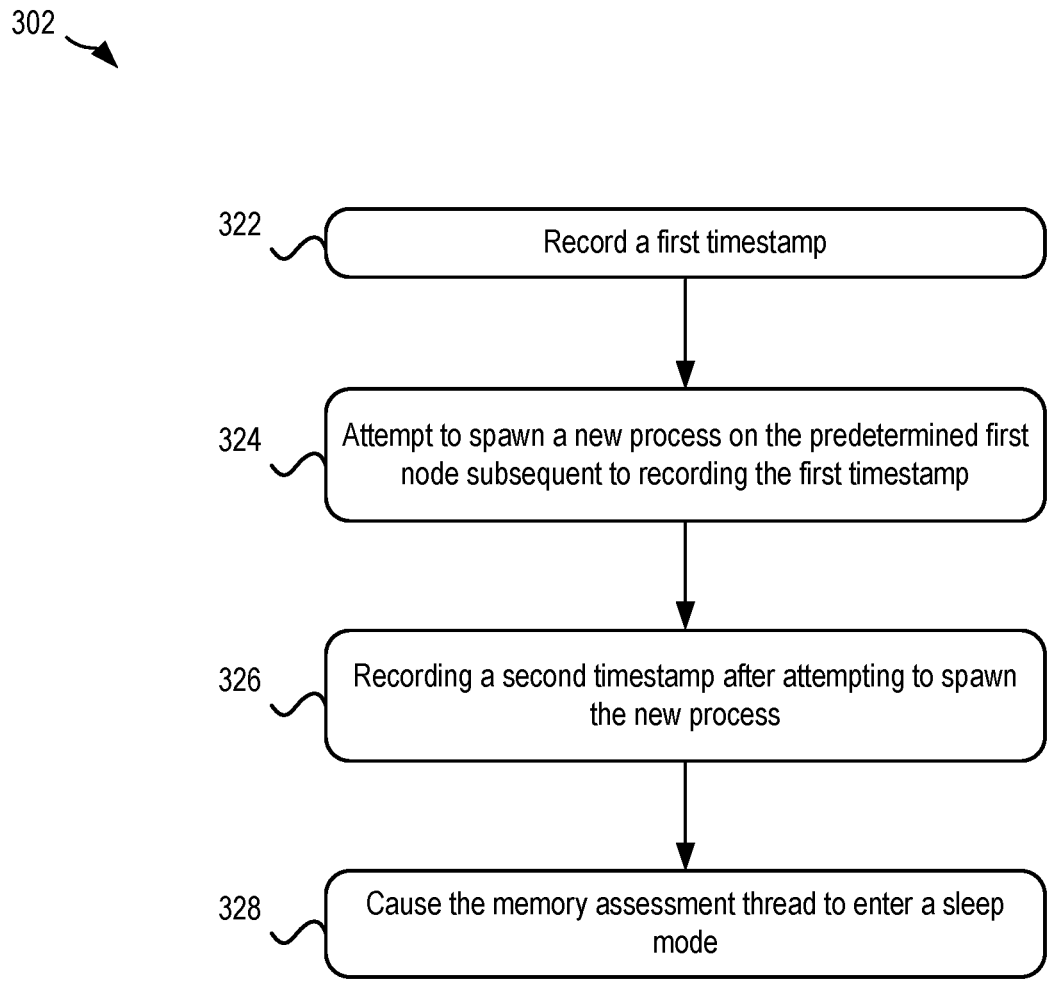
FIG. 3C is a flowchart of sub-operations of an operation of FIG. 3A, in accordance with one embodiment of the present invention.

Although various approaches described above detail use of allocating and attempting to fill dedicated memory of the predetermined first node in order to determine the first memory contention state, in some other approaches, method 300 may additionally and/or alternatively include performing another type of relatively intensive memory operation to determine such a memory contention state, e.g., see FIG. 3C. Looking to FIG. 3C, exemplary sub-operations of performing a second predetermined memory contention state determination sequence for the predetermined first node (hereafter also referred to as the "second sequence") are illustrated in accordance with one embodiment, one or more of which may be used to perform operation 302 of FIG. 3A. However, it should be noted that the sub-operations of FIG. 3C are illustrated in accordance with one embodiment which is in no way intended to limit the invention.

It may be prefaced that, various sub-operations of the flowchart of FIG. 3C generate recordings of timestamps that may be applied using similar techniques to those described with respect to the flowchart and recording of timestamps of FIG. 3B. In other words, in some of such approaches, method 300 may spawn a new process and record and use timestamps with respect to the new process in a similar manner to how the timestamps recorded with respect to the memory allocation and fill operations described elsewhere herein (see FIG. 3B). Furthermore, in some other approaches, the second sequence may be performed in addition to and/or alternative to the first sequence.

Method 300, in some approaches, includes causing the memory assessment thread to perform the second predetermined node memory contention state determination sequence. The second sequence, in some preferred approaches, includes recording, with the memory assessment thread, a third timestamp in a shared memory device, e.g., see sub-operation 322. For context, the third timestamp may record a starting time of the second predetermined memory contention state determination sequence.

Sub-operation 324 includes attempting to spawn a new process on the predetermined first node subsequent to recording the first timestamp. For context, causing, e.g., instructing, a new process to be spawned on the predetermined first node is likely to case relatively significant delays in the predetermined first node in the event that the predetermined first node is low on memory, e.g., has less than the predetermined amount of dedicated memory available. Accordingly, spawning the new process enables a check to be performed that reveals whether or not the predetermined first node is currently experiencing memory starvation issues. For example, in the event that the new process is successfully spawned on the predetermined first node, the spawn process will incur relatively significant delay in cases in which the predetermined first node is currently experiencing memory starvation issues. In cases in which the predetermined first node is currently experiencing memory starvation issues, the new process may fail to spawn on the predetermined first node as a result of the memory starvation issues.

Sub-operation 326 includes recording, with the memory assessment thread, a fourth timestamp after attempting to spawn the new process. The fourth timestamp is different than the third timestamp, and the recording of the fourth timestamp is performed after the third timestamp is recorded and in some cases, preferably after attempting to spawn the new process is complete. In some approaches, the fourth timestamp is a greater value than the third timestamp in response to the new process not failing to spawn. In contrast, in some other approaches, the fourth timestamp may be a null value in response to the new process failing to spawn. The memory assessment thread may be caused to enter a sleep mode in response to the second timestamp being recorded, e.g., see operation 328.

Method 300 may, in some approaches, include determining a second memory contention state of the predetermined first node based on results of performing the second sequence. The results may, in some preferred approaches, be determined based on a comparison of the third timestamp and the fourth timestamp using similar techniques to those described elsewhere herein with respect to the first timestamp and the second timestamp (respectively). The determined second memory contention state may be caused to be included in a second type of message sent to a third node and/or the second node. In some approaches, the second type of message may, at least in part, be sent by performing a periodic remote procedure call. The third node may, in some approaches, be a node of the cluster that is not the cluster manager node and is not the predetermined first node. The third node may be configured to send an expel request message for the predetermined first node to the cluster manager node based on an evaluation of the determined second memory contention state in the second type of message. For example, in some approaches, the second type of message is a response message to a periodic inquiry sent from the third node to the predetermined first node. In some approaches, the third node may wait for a reply from the predetermined first node for more than a predetermined amount of time. In response to a determination that a reply has not been received from the predetermined first node for more than a predetermined amount of time, the third node may send an expel request for the first predetermined node to the second node, e.g., the cluster manager node.

Several performance benefits are enabled within the cluster as a result of the techniques of method 300. For example, as a result of causing nodes that are experiencing memory starvation to be expelled from the cluster, e.g., as a result of the memory contention state being determined and included in a message sent to the cluster manager, these nodes are prevented from causing delay in operations of the cluster. Furthermore, because the memory contention state may, in some approaches, be a mere value of "true" or "false" that may be added to a message that is already being sent to another node, such as the cluster manager node, an operational overhead is not incurred in node communication paths within the cluster. For example, in some approaches, the resulting flow in remote procedure calls is not delayed or impacted by the inclusion of an extra memory contention state value. This way, information detailing whether memory starvation exists in a given node is able to be reliably transmitted to the cluster manager node. Furthermore, remote procedure calls are not delayed by mechanisms that deploy the techniques described herein. Therefore, the predetermined first node is not considered as having failed by the cluster manager node which may otherwise occur if memory checks were otherwise performed in-line with the sending of the disk lease remote procedure calls. In summary, the techniques described herein take advantage of both the operations which do not block and those which do block. The disk lease remote procedure calls may tend not to block because those occur frequently. They transmit information that allows the cluster manager node to determine that the node is still alive. The disk lease remote procedure calls are also well positioned to transmit information regarding memory starvation, e.g., the memory contention state, to the cluster manager node, thus allowing the cluster manager node to decide whether to expel the predetermined first node, and also to potentially ultimately cause a system administrator to be warned about the predetermined first node running low on memory.

FIG. 4 depicts a sample of logical code 400, in accordance with one embodiment. As an option, the present sample of logical code 400 may be implemented in conjunction with features from any other embodiment listed herein, such as those described with reference to the other FIGS. Of course, however, such sample of logical code 400 and others presented herein may be used in various applications and/or in permutations which may or may not be specifically described in the illustrative embodiments listed herein. Further, the sample of logical code 400 presented herein may be used in any desired environment.

The sample of logical code 400 may be used to determine a memory contention state of a predetermined first node based on results of performing a sequence in which timestamps are recorded.

A first line 402 of the sample of logical code 400 includes a first predetermined condition that includes a first timestamp (T1) being less than a second timestamp (T2), and a difference of the second timestamp and the first timestamp being greater than or equal to a predetermined threshold (Threshold). A second line 404 of the sample of logical code 400 includes a second predetermined condition that includes the first timestamp being greater than the second timestamp, and a difference of a current timestamp (Tc) and the first timestamp being greater than or equal to the predetermined threshold.

In response to a determination that the first predetermined condition or the second predetermined condition are met, a memory contention state (memoryStarvation) of the predetermined first node is set to true, e.g., see line 406. In the else case, e.g., see line 408, the memory contention state is set to false, e.g., see line 410.

Software for performing the methodology of FIG. 3A may be deployed to a computer that causes a memory assessment thread to perform one or more of the predetermined node memory contention state determination sequences described herein. An exemplary process for such deployment is presented immediately below.

Figure 5:
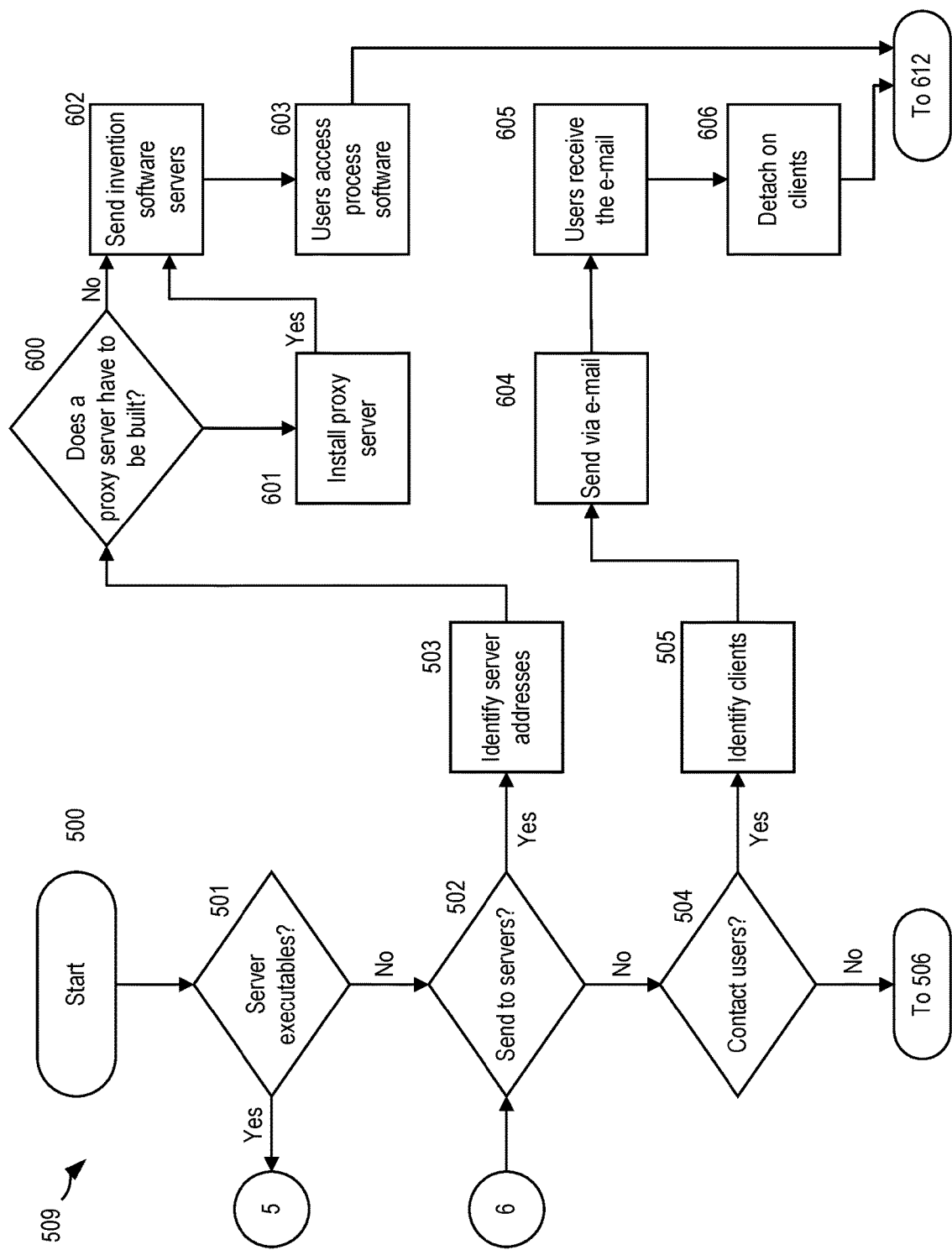
FIG. 5 is a flowchart of a method, in accordance with one embodiment of the present invention.
Figure 5:
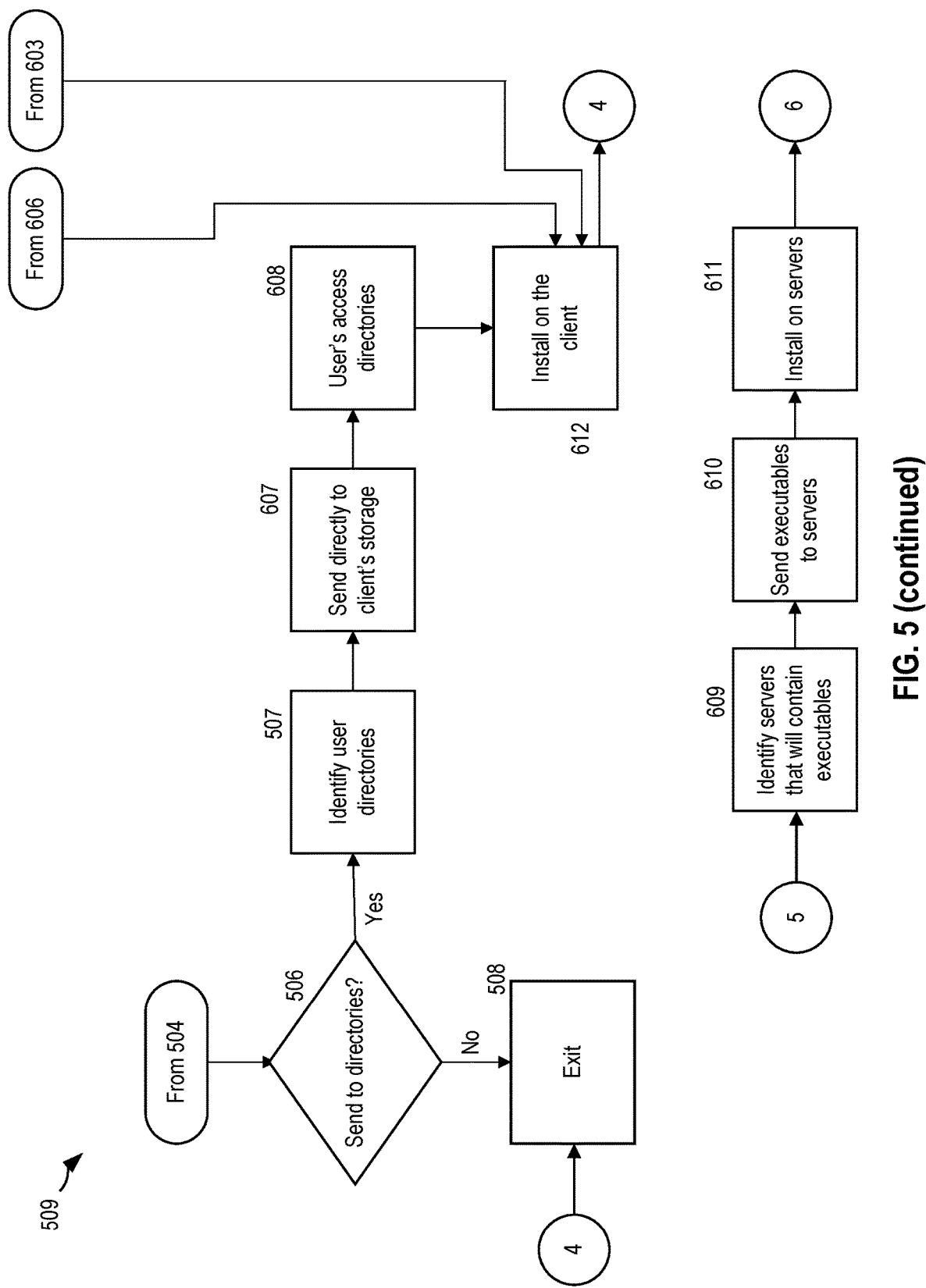

Now referring to FIG. 5, a flowchart of a method 509 is shown according to one embodiment. The method 509 may be performed in accordance with the present invention in any of the environments depicted in FIGS. 1-5, among others, in various embodiments. Of course, more or fewer operations than those specifically described in FIG. 5 may be included in method 509, as would be understood by one of skill in the art upon reading the present descriptions.

Each of the steps of the method 509 may be performed by any suitable component of the operating environment. For example, in various embodiments, the method 509 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 509. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software for determining a memory contention state of a node may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 500 begins the deployment of the process software. An initial step is to determine if there are any programs that will reside on a server or servers when the process software is executed (501). If this is the case, then the servers that will contain the executables are identified (609). The process software for the server or servers is transferred directly to the servers' storage via FTP or some other protocol or by copying though the use of a shared file system (610). The process software is then installed on the servers (611).

Next, a determination is made on whether the process software is to be deployed by having users access the process software on a server or servers (502). If the users are to access the process software on servers, then the server addresses that will store the process software are identified (503).

A determination is made if a proxy server is to be built (600) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (601). The process software is sent to the (one or more) servers either via a protocol such as FTP, or it is copied directly from the source files to the server files via file sharing (602). Another embodiment involves sending a transaction to the (one or more) servers that contained the process software, and having the server process the transaction and then receive and copy the process software to the server's file system. Once the process software is stored at the servers, the users via their client computers then access the process software on the servers and copy to their client computers file systems (603). Another embodiment is to have the servers automatically copy the process software to each client and then run the installation program for the process software at each client computer. The user executes the program that installs the process software on his client computer (612) and then exits the process (508).

In step 504 a determination is made whether the process software is to be deployed by sending the process software to users via e-mail. The set of users where the process software will be deployed are identified together with the addresses of the user client computers (505). The process software is sent via e-mail (604) to each of the users' client computers. The users then receive the e-mail (605) and then detach the process software from the e-mail to a directory on their client computers (606). The user executes the program that installs the process software on his client computer (612) and then exits the process (508).

Lastly, a determination is made on whether the process software will be sent directly to user directories on their client computers (506). If so, the user directories are identified (507). The process software is transferred directly to the user's client computer directory (607). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (608). The user executes the program that installs the process software on his client computer (612) and then exits the process (508).

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   causing a memory assessment thread to perform a first predetermined node memory contention state determination sequence for a predetermined first node, wherein the first predetermined node memory contention state determination sequence includes:
      recording a first timestamp,
      allocating dedicated memory of the predetermined first node, wherein at least a majority portion of the dedicated memory is allocated,
      attempting to fill the allocated memory with content subsequent to recording the first timestamp,
      recording a second timestamp after attempting to fill the allocated memory;
   determining a first memory contention state of the predetermined first node based on results of performing the first predetermined node memory contention state determination sequence; and
   causing the determined first memory contention state to be included in a first type of message sent to a second node.

2. The computer-implemented method of claim 1, wherein the first predetermined node memory contention state determination sequence includes:
   freeing the allocated memory, and
   causing the memory assessment thread to enter a sleep mode.

3. The computer-implemented method of claim 1, comprising: determining the results of performing the first predetermined node memory contention state determination sequence, wherein determining the results includes:
   comparing the first timestamp to the second timestamp; and
   in response to a determination that a first predetermined condition is met, setting the first memory contention state of the predetermined first node to true,
   wherein the first predetermined condition includes the first timestamp being less than the second timestamp, and a difference of the second timestamp and the first timestamp being greater than or equal to a predetermined threshold.

4. The computer-implemented method of claim 3, wherein the first predetermined node memory contention state determination sequence includes: obtaining a current timestamp, wherein determining the results includes:

comparing the first timestamp to the second timestamp;
determining a difference of the current timestamp and the first timestamp; and
in response to a determination that a second predetermined condition is met, setting the first memory contention state of the predetermined first node to true,
wherein the second predetermined condition includes the first timestamp being greater than the second timestamp, and the difference of the current timestamp and the first timestamp being greater than or equal to the predetermined threshold.

5. The computer-implemented method of claim 4, wherein determining the results includes:
in response to a determination that the first predetermined condition is not met and a determination that the second predetermined condition is not met, setting the first memory contention state of the predetermined first node to false.

6. The computer-implemented method of claim 1, wherein the second node is a cluster manager node that manages a cluster that includes the predetermined first node, wherein the cluster manager node is configured to expel at least the predetermined first node from the cluster.

7. The computer-implemented method of claim 6, wherein the first type of message is selected from the group consisting of: a message that is periodically sent to the second node by the predetermined first node, and a reply to a second type of message received by the predetermined first node from the second node.

8. The computer-implemented method of claim 1, comprising: periodically sending the first type of message to the second node, wherein the first type of message requests the second node to respond to a message previously sent to the second node by the predetermined first node.

9. The computer-implemented method of claim 1, comprising:
causing the memory assessment thread to perform a second predetermined node memory contention state determination sequence for the predetermined first node, wherein the second predetermined node memory contention state determination sequence includes:
recording a third timestamp,
attempting to spawn a new process on the predetermined first node subsequent to recording the first timestamp,
recording a fourth timestamp after attempting to spawn the new process;
determining a second memory contention state of the predetermined first node based on results of performing the second predetermined node memory contention state determination sequence; and
causing the determined second memory contention state to be included in a second type of message sent to a third node.

10. A computer program product, the computer program product comprising a computer readable storage medium having program instructions embodied therewith, the program instructions readable and/or executable by a computer to cause the computer to:
cause a memory assessment thread to perform a first predetermined node memory contention state determination sequence for a predetermined first node, wherein the first predetermined node memory contention state determination sequence includes:
recording a first timestamp,
allocating dedicated memory of the predetermined first node, wherein at least a majority portion of the dedicated memory is allocated,
attempting to fill the allocated memory with content subsequent to recording the first timestamp,
recording a second timestamp after attempting to fill the allocated memory;
determine a first memory contention state of the predetermined first node based on results of performing the first predetermined node memory contention state determination sequence; and
cause the determined first memory contention state to be included in a first type of message sent to a second node.

11. The computer program product of claim 10, wherein the first predetermined node memory contention state determination sequence includes:
freeing the allocated memory, and
causing the memory assessment thread to enter a sleep mode.

12. The computer program product of claim 10, the program instructions readable and/or executable by the computer to cause the computer to: determine the results of performing the first predetermined node memory contention state determination sequence, wherein determining the results includes:
comparing the first timestamp to the second timestamp; and
in response to a determination that a first predetermined condition is met, setting the first memory contention state of the predetermined first node to true,
wherein the first predetermined condition includes the first timestamp being less than the second timestamp, and a difference of the second timestamp and the first timestamp being greater than or equal to a predetermined threshold.

13. The computer program product of claim 12, wherein the first predetermined node memory contention state determination sequence includes: obtaining a current timestamp, wherein determining the results includes:
comparing the first timestamp to the second timestamp;
determining a difference of the current timestamp and the first timestamp; and
in response to a determination that a second predetermined condition is met, setting the first memory contention state of the predetermined first node to true,
wherein the second predetermined condition includes the first timestamp being greater than the second timestamp, and the difference of the current timestamp and the first timestamp being greater than or equal to the predetermined threshold.

14. The computer program product of claim 13, wherein determining the results includes:
in response to a determination that the first predetermined condition is not met and a determination that the second predetermined condition is not met, setting the first memory contention state of the predetermined first node to false.

15. The computer program product of claim 10, wherein the second node is a cluster manager node that manages a cluster that includes the predetermined first node, wherein the cluster manager node is configured to expel at least the predetermined first node from the cluster.

16. The computer program product of claim 15, wherein the first type of message is selected from the group consisting of: a message that is periodically sent to the second node by the predetermined first node, and a reply to a second type of message received by the predetermined first node from the second node.

17. The computer program product of claim 10, the program instructions readable and/or executable by the computer to cause the computer to: periodically send the first type of message to the second node, wherein the first type of message requests the second node to respond to a message previously sent to the second node by the predetermined first node.

18. The computer program product of claim 10, the program instructions readable and/or executable by the computer to cause the computer to:
   cause the memory assessment thread to perform a second predetermined node memory contention state determination sequence for the predetermined first node, wherein the second predetermined node memory contention state determination sequence includes:
      recording a third timestamp,
      attempting to spawn a new process on the predetermined first node subsequent to recording the first timestamp,
      recording a fourth timestamp after attempting to spawn the new process;
   determine a second memory contention state of the predetermined first node based on results of performing the second predetermined node memory contention state determination sequence; and
   cause the determined second memory contention state to be included in a second type of message sent to a third node.

19. A system, comprising:
   a processor; and
   logic integrated with the processor, executable by the processor, or integrated with and executable by the processor, the logic being configured to:
   cause a memory assessment thread to perform a first predetermined node memory contention state determination sequence for a predetermined first node, wherein the first predetermined node memory contention state determination sequence includes:
      recording a first timestamp,
      allocating dedicated memory of the predetermined first node, wherein at least a majority portion of the dedicated memory is allocated,
      attempting to fill the allocated memory with content subsequent to recording the first timestamp,
      recording a second timestamp after attempting to fill the allocated memory;
   determine a first memory contention state of the predetermined first node based on results of performing the first predetermined node memory contention state determination sequence; and
   cause the determined first memory contention state to be included in a first type of message sent to a second node.

20. The system of claim 19, wherein the first predetermined node memory contention state determination sequence includes:
   freeing the allocated memory, and
   causing the memory assessment thread to enter a sleep mode.

* * * * *